US007047338B1

(12) United States Patent
Nguyen et al.

(10) Patent No.: US 7,047,338 B1
(45) Date of Patent: May 16, 2006

(54) CONFIGURABLE HOT-SWAP COMMUNICATION

(75) Inventors: Khanh Trang Nguyen, Carson, NV (US); James W. Stockdale, Clio, CA (US)

(73) Assignee: IGT, Reno, NV (US)

(*) Notice: Subject to any disclaimer, the term of this patent is extended or adjusted under 35 U.S.C. 154(b) by 556 days.

(21) Appl. No.: 09/618,365

(22) Filed: Jul. 18, 2000

(51) Int. Cl.
*G06F 13/00* (2006.01)

(52) U.S. Cl. ...................... 710/302; 710/301; 710/303; 710/304; 463/42

(58) Field of Classification Search ................ 710/110, 710/107, 64, 200, 72, 301–304; 463/42, 463/43, 16, 46; 709/200, 223
See application file for complete search history.

(56) References Cited

U.S. PATENT DOCUMENTS

| | | | | |
|---|---|---|---|---|
| 4,516,777 | A * | 5/1985 | Nikora | 463/46 |
| 5,274,765 | A | 12/1993 | Le Gallo | 395/275 |
| 5,643,086 | A | 7/1997 | Alcorn et al. | 463/29 |
| 5,741,183 | A * | 4/1998 | Acres et al. | 463/42 |
| 5,761,647 | A | 6/1998 | Boushy | 705/10 |
| 5,892,974 | A * | 4/1999 | Koizumi et al. | 710/16 |
| 5,909,556 | A * | 6/1999 | Morriss et al. | 710/100 |
| 6,104,815 | A | 8/2000 | Alcorn et al. | 380/251 |
| 6,106,396 | A | 8/2000 | Alcorn et al. | 463/29 |
| 6,149,522 | A | 11/2000 | Alcorn et al. | 463/29 |
| 6,178,474 | B1 * | 1/2001 | Hamano et al. | 710/303 |
| 6,295,566 | B1 * | 9/2001 | Stufflebeam | 710/302 |
| 6,338,105 | B1 * | 1/2002 | Niizuma et al. | 710/72 |
| 6,346,045 | B1 * | 2/2002 | Rider et al. | 463/31 |
| 6,587,909 | B1 * | 7/2003 | Olarig et al. | 710/302 |
| 6,805,634 | B1 * | 10/2004 | Wells et al. | 463/42 |
| 2002/0109975 | A1 * | 8/2002 | Boe | 361/801 |
| 2005/0223090 | A1 * | 10/2005 | Ewing et al. | 709/223 |

FOREIGN PATENT DOCUMENTS

| | | | |
|---|---|---|---|
| EP | 0 953 930 | A2 | 11/1999 |
| EP | 1 094 425 | A2 | 4/2001 |
| GB | 2 101 381 | A | 1/1983 |
| WO | WO 96/21974 | | 7/1996 |

OTHER PUBLICATIONS

IBM®, Method for Card "Hot Plug" Detectin and Control, Oct. 1992, IBM® Technical Disclosure Bulletin, vol. 35, No. 5, pp. 391-394.

* cited by examiner

*Primary Examiner*—Rehana Perveen
*Assistant Examiner*—Kim T. Huynh
(74) *Attorney, Agent, or Firm*—Beyer Weaver & Thomas, LLP

(57) ABSTRACT

A disclosed communication interface for a gaming machine has a main communication board with one or more standard receptor slots for a plurality of "daughter boards," each daughter board allowing communication between a master gaming controller and a gaming device or between a master gaming controller and a gaming machine network. The daughter boards may be designed to convert between a number of different communication standards or communication formats. Further, the daughter boards may employ a standard connector that allows the daughter board to be plugged into any of the standard receptor slots on the main communication board. Daughter boards may be removed or installed on the main communication board while the main communication board is receiving power. Further, the main communication board with a plurality of standard receptor slots may accommodate many different types of daughter boards and many different combinations of these types of daughter boards.

10 Claims, 5 Drawing Sheets

CONFIGURABLE HOT-SWAP COMMUNICATION

BACKGROUND OF THE INVENTION

This invention relates to gaming devices for gaming machines such as slot machines and video poker machines. More particularly, the present invention relates to communication converter boards for communication between gaming devices and the gaming machine or for communication between different gaming machines.

There are a wide variety of associated devices that can be connected to a gaming machine such as a slot machine or video poker machine. Some examples of these devices are lights, ticket printers, card readers, speakers, bill validators, coin acceptors, display panels, key pads, and button pads. Many of these devices are built into the gaming machine. Often, a number of devices are grouped together in a separate box that is placed on top of the gaming machine. Devices of this type are commonly called a top box.

Typically, the gaming machine controls various combinations of devices. These devices provide gaming features that augment the features of the gaming machine. Further, many devices such as top boxes are designed to be removable from the gaming machine to provide flexibility in selecting the game features of a given gaming machine.

Multiple gaming machines can be linked together via a communication network to provide information about the status of the gaming machines to a remote location. For example, the amount of money entered into a group of gaming machines may be pooled together to provide a larger jackpot as part of a wide area progressive network. As money is deposited in an individual gaming machine, this information can be relayed over the communication network to a central location where the total amount of money in the jackpot is tracked. The information on the total jackpot may be sent out over the wide area progressive network to display signs displaying the jackpot amount.

As another example, a group of gaming machines provided in a casino may be linked together to form a casino area network. Many current gaming machines include player tracking devices including magnetic card readers, display panels, and key pad interfaces that allow a player playing a game on a gaming machine to enter information about themselves into the gaming machine. The player tracking information entered into the gaming machine by the player may be sent to a remote location different from the gaming machine using the casino area network. Other information about the status gaming machine including the amount of usage and whether the gaming machine is operating properly may also be sent via the casino area network.

The features of gaming devices are usually controlled by a "master gaming controller" within the gaming machine. The master gaming controller may gather or send information to gaming devices residing on the gaming machine or other devices connected to the gaming machine via a communication network. For example, during a game the master gaming controller might receive information from a key pad interface or a magnetic card read reader and then send information to be displayed on a display screen residing on the gaming machine. Further, the gaming machine might send information from the magnetic card reader or key pad interface to a remote location via a communication network and receive information from a remote location via a communication network to be displayed on a display screen. For the master gaming controller to perform these operations, connections from the devices may be wired directly into some type of electronic board (e.g., a "back plane" or "mother board") containing the master gaming controller. Further, the master gaming controller may be connected to some of the gaming devices and the communication network through a main communication board located within the gaming machine.

A network of gaming machines may be hooked together in a daisy chain with information propagated up and down the chain via connections between the main communication boards located within each gaming machine. Thus, to maintain the flow of information within the network, the main communication board of each gaming machine always has to be operating. Typically, the main communication board has a separate power supply from the rest of the gaming machine such that the gaming machine may be shutdown for maintenance or for some other reason without breaking the chain of the communication network.

A wide variety of gaming devices including player tracking devices, wide area network devices, and casino area network devices exist which may be connected to a main communication board within the gaming machine. Typically, the main communication board is connected to a gaming machine network and a master gaming controller within the gaming machine. These gaming devices are built by a number of different manufactures using different communication standards. To accommodate the different devices potentially connected to a main communication board, a large number of different types of main communication boards and motherboards have been built in the past. Building these different boards is time consuming and costly. Accordingly, it would be desirable to have a main communication board that is configurable to accommodate the large number of gaming devices which might be connected to a main communication board.

Another disadvantage of current main communication boards is the susceptibility to damage from devices connected to the board. When a gaming machine is connected to a network of gaming machines, damage to the main communication board on one machine can bring down a portion of the network. For example, when a device connected to the main communication board is being replaced or a new device is being installed, the main communication board can be damaged when the main power is not turned off to the gaming machine. As another example, a player tracking device may generate an electrostatic charge during its operation that can damage the main communication board. Accordingly, it would be desirable to have a main communication board which is less susceptible to damage.

Another disadvantage of current main communication boards is that the whole board is usually replaced when a portion of the board is damaged. For example, a portion of the main communication board might be damaged that enables communication to a player tracking device while the portion of the board that enables network communications is still operating properly. To repair the portion of the board that enables communication to the player tracking device, the whole board is usually replaced. Thus, although the portion of the main communication board that provides network communications is still operating properly, communication capabilities along a network segment can be lost while the main communication board is being replaced. Accordingly, it would be desirable to have a main communication board which can be repaired without interrupting network communications when the network communications are operating properly.

SUMMARY OF THE INVENTION

This invention addresses the needs indicated above by providing a communication interface for a gaming machine which has a main communication board with one or more standard receptor slots for a plurality of "daughter boards," each daughter board allowing communication between a master gaming controller and a gaming device or between a master gaming controller and a gaming machine network. The daughter boards may be designed to convert between a number of different communication standards or communication formats. Further, the daughter boards preferably employ a standard connector that allows the daughter board to be plugged into any of the standard receptor slots on the main communication board. Daughter boards can be removed or installed on the main communication board while the main communication board is receiving power. Further, the main communication board with a plurality of standard receptor slots can accommodate many different types of daughter boards and many different combinations of these types of daughter boards.

One aspect of the present invention provides a communication interface for a gaming machine that can be characterized as including a main communication board and one or more daughter boards. The gaming machine may be a traditional slot game, a video slot game, a video poker game, keno game, or a lottery game. As described above, the main communication board should include at least one power connection, a communication connection configured to communicate with a master gaming controller of the gaming machine, and at least one standard receptor slot. The daughter boards are configured to plug into the receptor slot of the main communication board and thereby provide a specified communication format for allowing the gaming machine to communicate with a gaming machine device or a gaming machine network. The gaming machine may communicate with one or more gaming machine devices selected from the group consisting of magnetic card readers, display screens, key pads, network devices or display signs. Typically, the network will be a casino area network or a wide area progressive network.

In one embodiment the standard receptor slot or the main communication board is configured to accept a 15 pin connector. Further, the standard receptor slot may be configured to accept a connector with one or more ground pins and one or more power pins wherein the ground pins are longer than the power pins on the connector. The standard receptor may supply power and a communication signal to the daughter board when the daughter board is plugged into the standard receptor slot. The power connection to the main communication board may receive power from a substantially non-varying power source. Further, the main communication board may include a second power connection which receives power from a power source which is shut off by a switch within the gaming machine.

Another aspect of the invention provides a daughter board for converting signals in a first communication format from a master gaming controller to a second communication format for transmission, the daughter board including 1) a standard connector for plugging into a standard receptor slot of a main communication board on the gaming machine and for receiving the signals in the first communication format from the master gaming controller, 2) conversion circuitry for converting signals from the first communication format to the second communication format; and 3) an output mechanism coupled to the conversion circuitry and allowing transmission of signals in the second format. The first or second communication formats may be selected from the group consisting of RS-422/485, Fiber Optic, RS-232, DCS Current Loop, Link Progressive Current Loop and USB. Typically, the first communication format will be an RS-232 communication format. Further, a daughter board may include an optocoupler integrated circuit wherein in the optocoupler integrated circuit is configured to provide electrical isolation between the gaming machine device and the main communication board.

In preferred embodiments, the conversion circuitry provides a communication conversion allowing the master gaming controller to communicate with a gaming machine device or a network. The output mechanism to the gaming machine device or network may be a fiber optic cable, a ribbon line cable, a twisted cable pair or other wire medium. Further, the daughter board may include an echo disable circuitry wherein the echo disable circuitry is configured to receive a signal that disables the transmission of signals from the output mechanism. The standard connector is configured to receive power from the main communication board. In one embodiment, the standard connector is a 15 pin connector with one or more power pins and one or more ground pins wherein the ground pins are longer than the power pins.

Another aspect of the invention provides a method of communicating with a gaming machine network and with a gaming machine device via multiple communication formats where the gaming machine has a master gaming controller and a main communication board allowing communication via the various communications formats. The method may be characterized as including 1) providing a first daughter board in a first standard receptor slot of the main communication board, wherein first daughter board converts signals in a first communications format from the master gaming controller to signals in a second communications format for transmission to the gaming machine device 2) providing a second daughter board in a second standard receptor slot of the main communication board, wherein the second daughter board converts signals in a first communications format from the master gaming controller to signals in a third communications format for transmission to the gaming machine network 3) replacing the first daughter board with a third daughter board in the first standard receptor slot of the main communication board while the second daughter board converts signals in a first communications format from the master gaming controller to signals in a third communications format for transmission to the gaming machine network. Typically, the gaming machine network is a casino area network or a wide area progressive network and the gaming machine device is selected from a group consisting of magnetic card readers, display screens, key pads, network devices or display signs.

These and other features of the present invention will be presented in more detail in the following detailed description of the invention and the associated figures.

DESCRIPTION OF THE PREFERRED EMBODIMENTS

Figure 1:
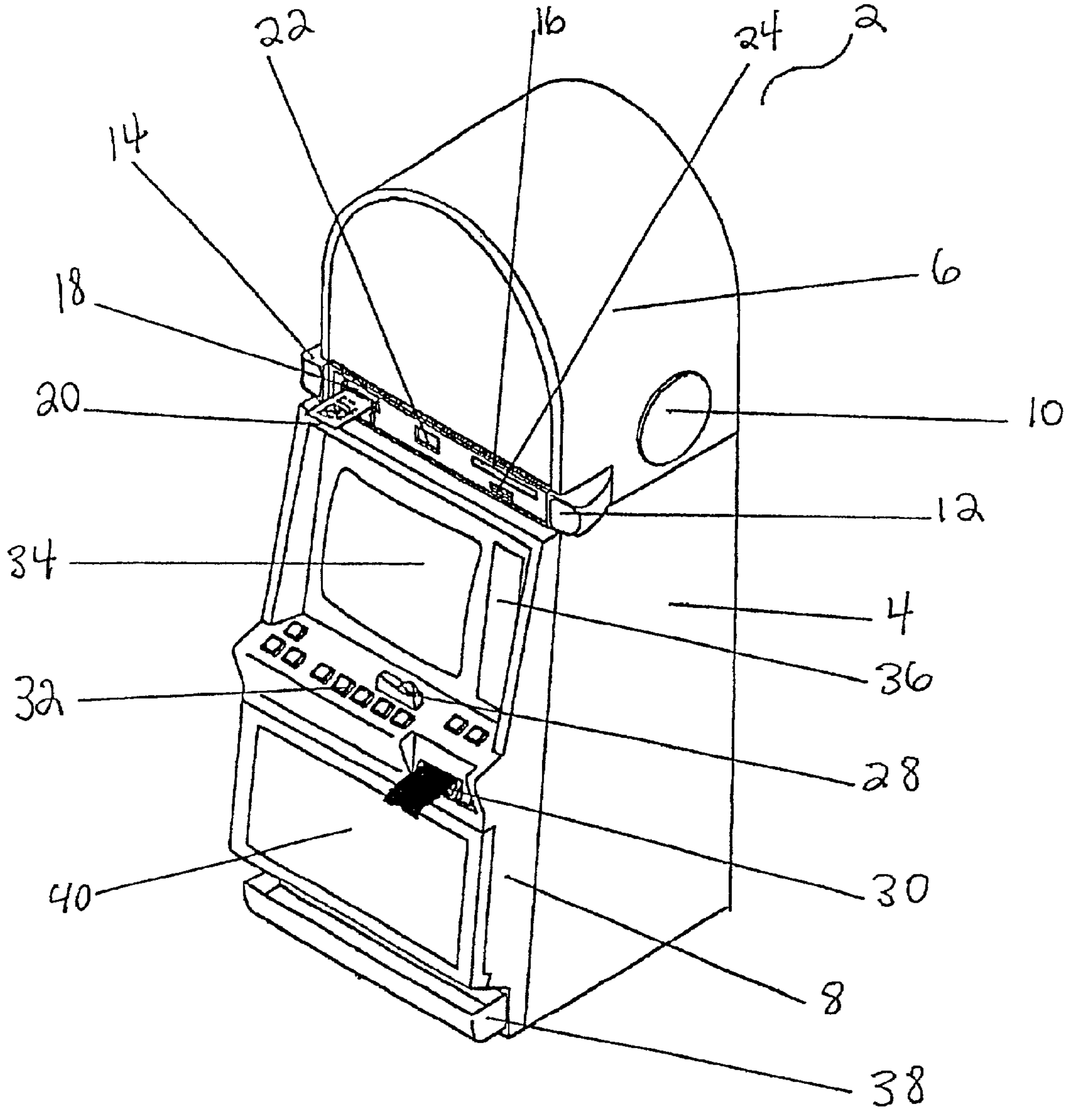
FIG. 1 is a perspective drawing of a gaming machine having a top box and other devices.

Turning first to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Typically, the main door 8 and/or any other portals which provide access to the interior of the machine utilize a locking mechanism of some sort as a security feature to limit access to the interior of the gaming machine. Attached to the main door are player-input switches 32, a coin acceptor 28, and a bill validator 30, a coin tray 38, a belly glass 40, and a monitor mask 42. Viewable through the main door is a video display monitor 34 and an information panel 36. The display monitor 34 will typically be a cathode ray tube, high resolution flat-panel LCD, or other conventional electronically controlled video monitor. The information panel 36 is a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (not shown) housed inside the main cabinet 4 of the machine 2. Many possible games, including traditional slot games, video slot games, video poker, keno, and lottery, may be provided with gaming machines of this invention.

The gaming machine 2 includes a top box 6, which sits on top of the main cabinet 4. The top box 6 can house a number of devices including speakers 10, 12, 14, a glass panel with display lamps 16, a ticket printer 18 which prints bar-coded tickets 20, a key pad 22 for entering player tracking information, a florescent display 24 for displaying player tracking information, and a card reader 26 for entering a magnetic striped card containing player tracking information. The top box 6 may house different or additional devices than shown in the FIG. 1. The devices housed in the top box 6 add features to a game played on the machine 2. During a game, these devices are controlled, in part, by circuitry (not shown) housed within the main cabinet 4 of the machine 2. The top box 6 is designed to be removable from the machine 2. Typically, the top box 6 is replaced to repair a device within the top box 6 or to install a new top box 6 with a different set of devices.

Understand that gaming machine 2 is but one example from a wide range of gaming machine designs on which the present invention may be implemented. For example, not all suitable gaming machines have top boxes or player tracking features. Further, some gaming machines have two more game displays—mechanical and/or video. And, some gaming machines are designed for bar tables and have displays that face upwards. Those of skill in the art will understand that the present invention, as described below, can be deployed on most any gaming machine now available or hereafter developed.

When a user wishes to play the gaming machine 2, he or she inserts cash through the coin acceptor 28 or bill validator 30. At the start of the game, the player may enter playing tracking information using the card reader 26, the keypad 22, and the florescent display 26. During the game, the player views game information using the video display 34. Usually, during the course of a game, a player is required to make a number of decisions, which affect the outcome of the game. The player makes these choices using the player-input switches 32. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 including lights behind the front glass 16 on the top box 6 or from lights behind the belly glass 40. After the player has completed a game, the player may receive game tokens from the coin tray 38 or the ticket 20 from the printer 18, which may be used for further games. Further, the player may receive a ticket 20 for food, merchandise, or games from the printer 18.

Figure 2:
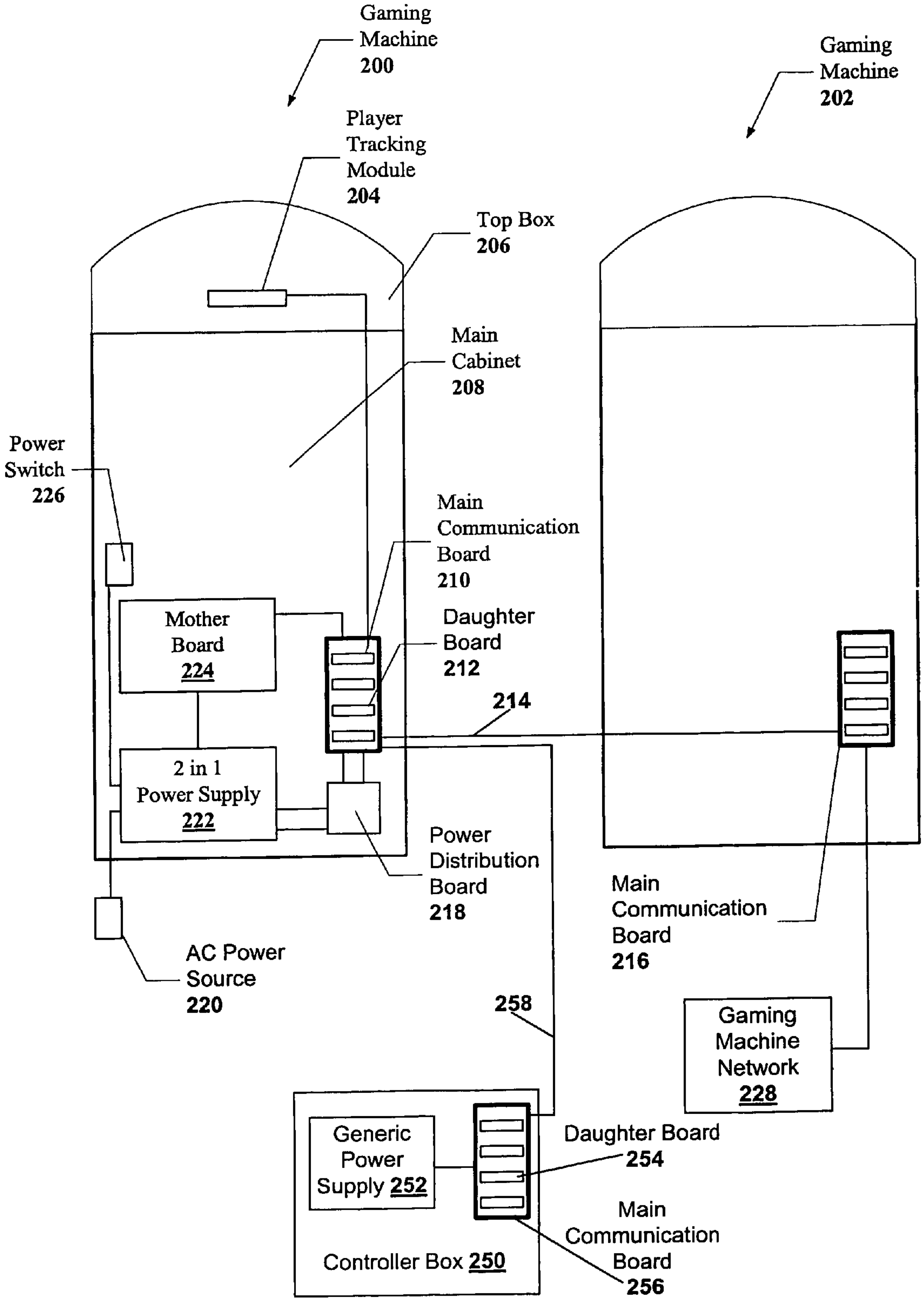
FIG. 2 is a block diagram depicting a gaming machine with a main communication board connected to another gaming machine.

FIG. 2 is a block diagram depicting a gaming machine with a main communication board connected to another gaming machine. The two gaming machines, 200 and 202, may be used to play a variety of different games including traditional slot games, video slot games, video poker games, keno games, and lottery games. The gaming machines 200 and 202 may be connected to each other and other gaming machines via gaming machine network of some type. For example, the gaming machines may be connected to a number of gaming machines to form a wide area progressive network. With a wide area progressive network, the jackpot on a given gaming machine in the network may be determined based upon the game play on all the gaming machines connected to the network. The gaming machines in the wide area network may be situated in many different locations. For example, gaming machines at many different casinos separated by significant distances may be connected together. As another example, the gaming machines 200 and 202 may be connected to a number of gaming machines residing within one casino to form a casino area network.

Gaming machines connected in a gaming machine network may be connected in various topologies. To maintain network communications, some of these require that each machine in the network operate properly. A daisy chain represents one example of topology that requires proper operation of each node. Information may be propagated up and down the chain from one gaming machine to another. When one gaming machine loses communication capability, the chain is broken and some of the gaming machines may no longer be able to communicate along the gaming machine network. For example, the gaming machines 200 and 202 might be connected to a gaming machine network 228 as part of a daisy chain. When the gaming machine 202 loses the ability to communicate with the gaming machine network 228, the gaming machine 200 may no longer communicate with the gaming machine network 228 even though it may be operating properly.

The gaming machine 200 may contain a top box 204, which sits on top of a main cabinet 208 of the gaming machine. As described in FIG. 1, the top box may be removable from the gaming machine. The gaming devices residing within (or otherwise connected to) the gaming machine may receive power from a 2 in 1 power supply 222. Typically, the power supply 222 is connected to an AC power source 220 of some type. The power supply 222 provides two sources of power. One source of power may be switched on and off with a power switch 226 located within the cabinet 208 of the gaming machine 200. The other source of power always remains on as long as the gaming machine 200 is receiving power from the AC power source. The power supply 222 is connected to a power distribution board 218. Usually, most of the gaming devices within the gaming machine receive power from the power source which may be turned on or off by the power switch 226. For example, when maintenance is being performed on the gaming machine, the power switch may be used to turn off power to most of the gaming devices within the gaming machine. When power is being supplied to the gaming machine, the main communication board 210 may receive a constant supply of power from the power distribution board 218. One reason for the constant supply of power to the main communication board 210 is to maintain the communication links between gaming machines when the gaming machine 200 is part of a gaming machine network.

In another embodiment, a main communication board 256 and a daughter board 254 may be used as part of a controller box 250. The controller box 250 is not contained within a gaming machine and may be used as a communication node on the gaming machine network 228. In this example, the main communication board 256 in the controller box 250 is connected to the main communication board 210 via the connection 258. The main communication board 258 is connected directly to a generic power supply 252 i.e. a power distribution board, such as the power distribution board 218 in gaming machine 200, is not used. The generic power supply 252 contains a main switch which turns the power supply on or off. When the main switch on the generic power supply is off 252, the power to all the devices connected to the power supply including the main communication board 256 are turned off.

The main communication board may be connected to a motherboard 224. The motherboard 224 may contain a master gaming controller (not shown) which controls the operation of devices on the gaming machine 200. Many of the hardware components of the motherboard may be similar to motherboards in other gaming machines including traditional slot games, video slot games, video poker games, keno games, and lottery games. The motherboard may be connected to the main communication board 210 using a ribbon cable or some other type of connection device. The player tracking module 204, which may contain the magnetic card reader, fluorescent display and key pad interface shown in FIG. 1, may be also connected to the main communication board. Typically, the player tracking module is connected to a daughter board 212 (which is one of four separate daughter boards shown in FIG. 2) with a ribbon cable or some other connection device. Then, the daughter board may be connected to the main communication board 210. The daughter board 212, is preferably a removable module, which may be plugged into the main communication board 210. One purpose of the daughter board may be to enable communication between devices using different communication standards. Details of the daughter board 214 will be described below with reference to FIGS. 3, 4, and 5.

The main communication board 210 may be connected to other gaming machines via some type of connection system 214. For example, the connection system may be a fiber optic cable. For a fiber optic cable, the connection 214 might plug into a daughter board 212 designed for fiber optic transmissions residing on the main communication board 210 of the gaming machine 200. Further, the fiber optic connection 214 from the main communication board on the gaming machine 200 might be connected to another fiber optic connection residing on the main communication board 216 of the gaming machine 202 which may be connected in some manner to other gaming machines on the gaming machine network 228. For example, the connection to the gaming machine network 228 might be via another fiber optic link or a dedicated phone line.

Besides network connections, other gaming machine devices which may be connected to a main communication board 210 via a daughter board 212 of some type include devices for communication with a wide area progressive network, display signs, devices for communication with a casino area network, player tracking systems and printer devices. For example, a display sign might display the value of a jackpot for a group gaming machine connected via a wide area progressive network. A gaming machine connected to the network and the display sign receives information from the wide area network on the current amount of the jackpot which may be updated at regular intervals. Then, a master gaming controller within the gaming machine might send commands to the display sign to display the amount of the jackpot on the display sign. The communication interface between the master gaming controller and the display sign could occur via a daughter board connected to the main communication board. Depending on the manufacturer of the display sign, a given display sign may utilize a different communication standard. Thus, the type of daughter board used for the communication interface between the master gaming controller and the display sign might vary depending on the communication standard used by the manufacturer of the display sign. Further, the type of daughter board used for communication interfaces with other gaming devices including player tracking devices, wide area network devices and casino area network devices might vary depending on the communication standard used by the manufacturer of these devices.

Figure 3:
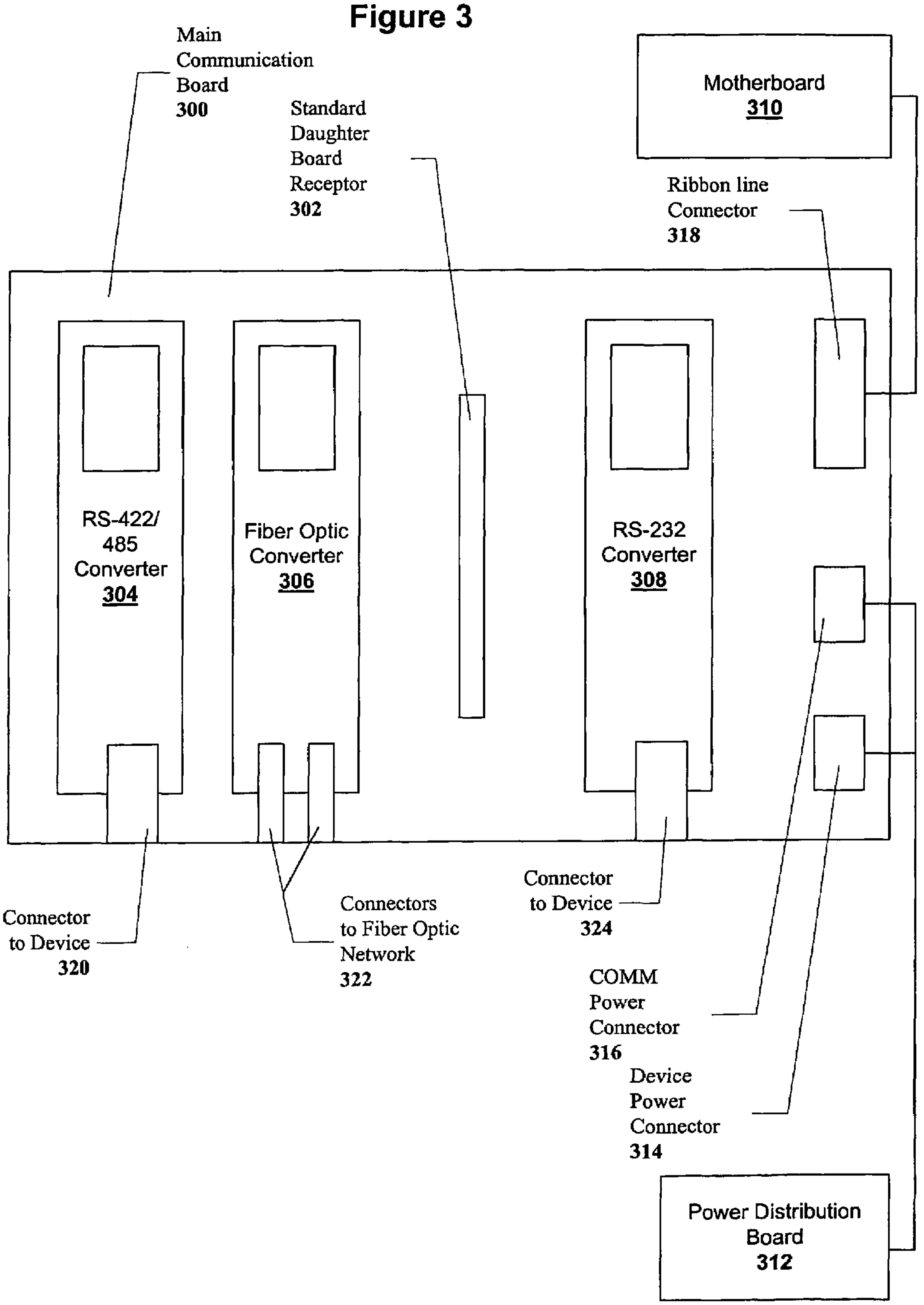
FIG. 3 is a block diagram depicting a more detailed example of a main communication board with a number of daughter boards.

FIG. 3 is a block diagram depicting a more detailed example of a main communication board 300 with a number of daughter boards. In this example, the main communication board 300 contains four daughter board receptors accepting up to four daughter boards. The main communication board may be connected to a motherboard 310, which may contain a master gaming controller and a CPU. The communication board 300 and the motherboard 310 may be connected by a ribbon line connector of some type 318. In one example, a ribbon line connector from the motherboard 310 to the main communication board 300 is designed for an RS-232 communication standard. The motherboard 310 may send signals via the RS-232 connection to each daughter board connected to the motherboard. As described above, many types of gaming devices may be connected to the main communication board including but not limited to player tracking devices (e.g. magnetic card readers, key pad interfaces, display panels), wide area network devices, casino area network devices, and display signs. Typically, these gaming devices may use different communication standards depending on the type of the gaming device and the manufacturer of the device. Five types of communication standards or communication formats may be used for most devices connected to the main communication board 300. These communication standards or communication formats include but are not limited to RS-422/485 and RS-232 (serial communication protocols established by the Institute of Electronic and Electrical Engineers (IEEE)), Fiber Optic, DCS Current Loop (communication standard by International Gaming Technology, Reno, Nev.) and Link Progressive Current Loop (communication standard by International Gaming Technology, Reno, Nev.). Since the motherboard 310 utilizes an RS-232 communication standard, communication converters may be used for the motherboard 310 to communicate with gaming devices connected to the main communication board 300 using the communication standards listed above.

One purpose of the daughter boards may be as a communication interfaces that convert the RS-232 communication standard from the motherboard 310 to another type of communication standard used by the gaming device such that communication between the motherboard 310 and the gaming device is enabled. The daughter board may enable communication from the gaming device to the motherboard or from the motherboard to the gaming device. Thus, the daughter board may convert communication signals from the communication format of the gaming device to the communication format of the motherboard 310 or it may convert signals from the communication format of the motherboard 310 to the communication format of the gaming device. This conversion allows two way communication between the gaming device and the motherboard 310. The motherboard 310 is not limited to the RS-232 communication standard and daughter boards may be designed that convert any communication standard used by the motherboard 310 to the communication standard of the gaming devices connected to the main communication board 300.

For example, in another embodiment, the method of communication between the master gaming controller on the motherboard 310 and the main communication board 300 may utilize the Universal Serial Bus (USB) (Communication protocol standards by the USB-IF, Portland, Oreg., http://www.usb.org). USB is a standard serial communication methodology used in the personal computer industry. USB allows multiple devices to be connected in a tiered star style configuration, utilizing repeater hubs as connection points of the tiered star. Communication data rates of USB are either 1.5 Mbits per second or 12 Mbits but may be increased as new versions of the USB standard are adopted.

When a USB cable is used to connect the motherboard 310 to the main communication board 300 instead of an RS-232 cable, a smaller cable with fewer connections may be used. Employing the USB cable and the USB communication protocol, multiple channels of serial communication may be carried over a single USB channel, using some method of data combining, such as time multiplexing. In this method, data transmitted or received from the external or peripheral devices is buffered and then transmitted or received at a specific time interval. The signaling medium for USB is identified as a differential data stream, where a pair of wires carries the data, one wire having the opposite voltage level from the second wire. This design may allow noise that may be present in a signal carried on the wire to be effectively filtered out at the receiver, resulting in higher data integrity.

Using a USB cable and protocol, in addition to isolation and signal conversion circuitry, some method of data decoding may need to be provided on the main communication board. In one embodiment, a microprocessor or microcontroller (not shown) is employed on the main communication board 300. The microcontroller executes software code to communicate with the master gaming controller via USB, receives data from the master gaming controller on the motherboard 310, determines which communication channel will be used in a data transmission and transmits the data to the appropriate communication channel. Likewise, the data received on any channel may be interpreted by the microcontroller, converted to a format compatible with the USB standard and then transmitted to the master gaming controller. For example, the microcontroller may receive data in any of the five formats described above including but not limited to RS-422/485, Fiber Optic, RS-232, DCS Current Loop and Link Progressive Current Loop as well as USB.

An advantage of using the USB as a communication method between the main communication board 300 and the master gaming controller is the expandibility built into the standard. Up to 127 devices using the USB standard may be connected in the tiered star configuration described above. Thus, multiple main communication boards may be attached to the master gaming controller expanding the number of communication channels available for communication with peripheral or network devices. The additional main communication boards may be added without modifying the number of serial channels on the motherboard 310.

In one embodiment of the present invention shown in FIG. 3, one daughter board receptor slot 302 is empty and three of the daughter board receptors (not shown) are filled with the daughter boards, 304, 306, and 308. Each daughter board may convert an RS-232 (or other format) communication signal from the motherboard 310 to another type of communication standard including but not limited to RS-422/485, Fiber Optic, RS-232, DCS Current Loop and Link Progressive Current Loop. In FIG. 3, three examples of daughter boards are shown including 1) a daughter board 304 for converting between RS-232 and RS-422/485, 2) a daughter board for converting between RS-232 and Fiber Optic and 3) a daughter board for converting between RS-232 and another RS-232. Other types of daughter boards might include but are not limited to converting between RS-232 and DCS Current Loop or converting between RS-232 and Link Progressive Current Loop. Typically, each daughter board will contain electronic circuitry on a circuit board of some type for performing the communication conversion, a connector for connecting into a daughter board receptor slot 302 on the main communication board and a connector to the gaming device or network. For example, the RS-422/485 daughter board contains circuitry for converting between the RS-232 communication standard and the RS-422/485 communication standard, a connection 320 to the gaming device which may carry power and data, and a connector to the main communication board (not shown). The connector 320 may be a ribbon line or some other type of connection system connected into the daughter board 304. The connection 324 to the gaming device for the RS-232 daughter board 308 may also be a ribbon line or some other type of connection system connected into the daughter board 308. The fiber optic daughter board 306 contains logic to communicate with a fiber optic network, two connectors 322 to the fiber optic network, and a connector (not shown) for an acceptor into the main communication board 300.

The main communication board 300 has four daughter board receptor slots where three slots (not shown) have daughter boards, 304, 306, and 308 plugged into the slots and one daughter board receptor slot 302 is empty. The main communication board 300 may be configured with a standard daughter board acceptor 302 and the daughter boards may be configured with a standard connector that connects into the daughter board receptor slot 302. For example, with a standard daughter board connector on each daughter board and a standard daughter board acceptor slot 302, the RS-422/485 converter daughter board 304, the fiber optic converter daughter board 306, or the RS-232 converter board 308 might be plugged into the standard daughter board receptor slot 302 or any of the other standard daughter board slots on the main communication board. For example, the RS-422/485 converter daughter board 304 might be plugged into the standard daughter board receptor slot where the Fiber Optic converter daughter board 306 is inserted and the Fiber Optic converter daughter board 306 might be plugged into the standard daughter board receptor slot where the RS-422/485 converter daughter board 304 is inserted.

When the daughter board is used to perform the communication conversion between the gaming device and the motherboard 310, the need to change the main communication board hardware 300 to accommodate gaming devices with different communication standards may be minimized. Thus, main communication boards 300 with many identical components may be employed to accommodate the many different combinations of gaming devices that may reside on a gaming machine. With standard daughter board receptor slots 302 on the main communication board 300 and standard connectors on the daughter boards which may be inserted into the standard daughter board receptor slots 302, the main communication board may be easily reconfigured and many different combination of daughter boards may be accommodated. For example, each standard receptor slot on the main communication board 300 might contain a fiber optic converter daughter board 306 or each standard daughter board receptor slot might contain a RS-232 converter daughter board 308 or two of the standard receptor slots might contain fiber optic converter daughter boards 306 and two of the standard receptor slots might contain RS-232 converter daughter boards 308. Thus, the main communication board 300 may accommodate many combinations of four or less types of daughter boards where some of the types of the daughter boards may be the same without changing the hardware on the main communication board 300.

When the USB standard is used, a second main communication board may be plugged into the standard board receptor 302 and connected to the main communication board 300. The second main communication board may accommodate the many combinations of daughter boards described above or may also be connected with another main communication board. Thus, a large number of daughter boards may be accommodated using the USB method.

Specific examples for the communication standards or communication formats used in the present invention are as follows. The RS-422/485 daughter board may employ a differential transceiver for Rx, Tx, DCD and DTR. It may use an I/O signal for the tri-state control of the output drivers. The fiber optic daughter board may employ fiber optic Rx, Tx and a second optional Tx as well as optional software for loop-back control from an I/O signal. The current loop daughter board may employ an open-collector with a pull-up resistor as required for Rx and an open-collector driver for Tx. The RS-232 daughter board may employ a singled-ended transceiver for Rx, Tx, CTS, RTS and ground.

The power for the main communication board may be from the power distribution board 312. The power distribution board may provide two types of power, COMM power and device power, to the main communication board 300. COMM power may be provided to the main communication board 300 via the COMM power connector 316 and device power may be provided to the main communication board 300 via the device power connector 314. The COMM power may be the constant source of power from the power supply 222 in FIG. 2. As described in FIG. 2, the COMM power remains on when the gaming machine is receiving power from an outside power source. The device power may provide power to most of the gaming devices within the gaming machine and may be switched off by a power switch located within the gaming machine. The COMM power may be employed to ensure that network devices within the gaming machine and connected to the main communication board 300 receive a constant supply of power when the device power to the gaming machine is turned off. For example, the device power to the gaming machine may be turned off when the maintenance is performed on the gaming machine. However, when the device power is turned off to the main communication board 300, the fiber optic daughter board 306 might continue to receive COMM power and communicate with the network. Further, one of the daughter boards might be replaced while the fiber optic daughter board 306 continues to communicates with the network. For example, the RS-232 converter daughter board 308 might be replaced with another RS-232 converter daughter board or a different type of daughter board while the fiber optic daughter board continues to communicate with the network. Further, the RS-232 converter daughter board 308 might be replaced with another RS-232 converter daughter board or a different type of daughter board while the device power is on the gaming machine is operating. When the main communication board 300 is receiving COMM power, all of the daughter board receptors, including the daughter board receptor slot 302, may receive COMM power. Thus, a network device, including the fiber optic daughter board 306, that requires a constant source of power may be connected into any receptor on the main communication board 300.

Using the USB method, the addition of serial channels via the attachment of additional main communication boards may be accomplished without removing power from the gaming machine. The USB standard is defined as a “hot swap” interface, similar to the method described above for the daughter boards. Thus, devices may be added or removed from USB while power is applied with no damage to the system. Additionally, the USB standard defines implementation methodologies where newly added devices can be identified for establishing a communication link between the master gaming controller and the newly added device. When a device is removed, the communication link is updated.

Figure 4:
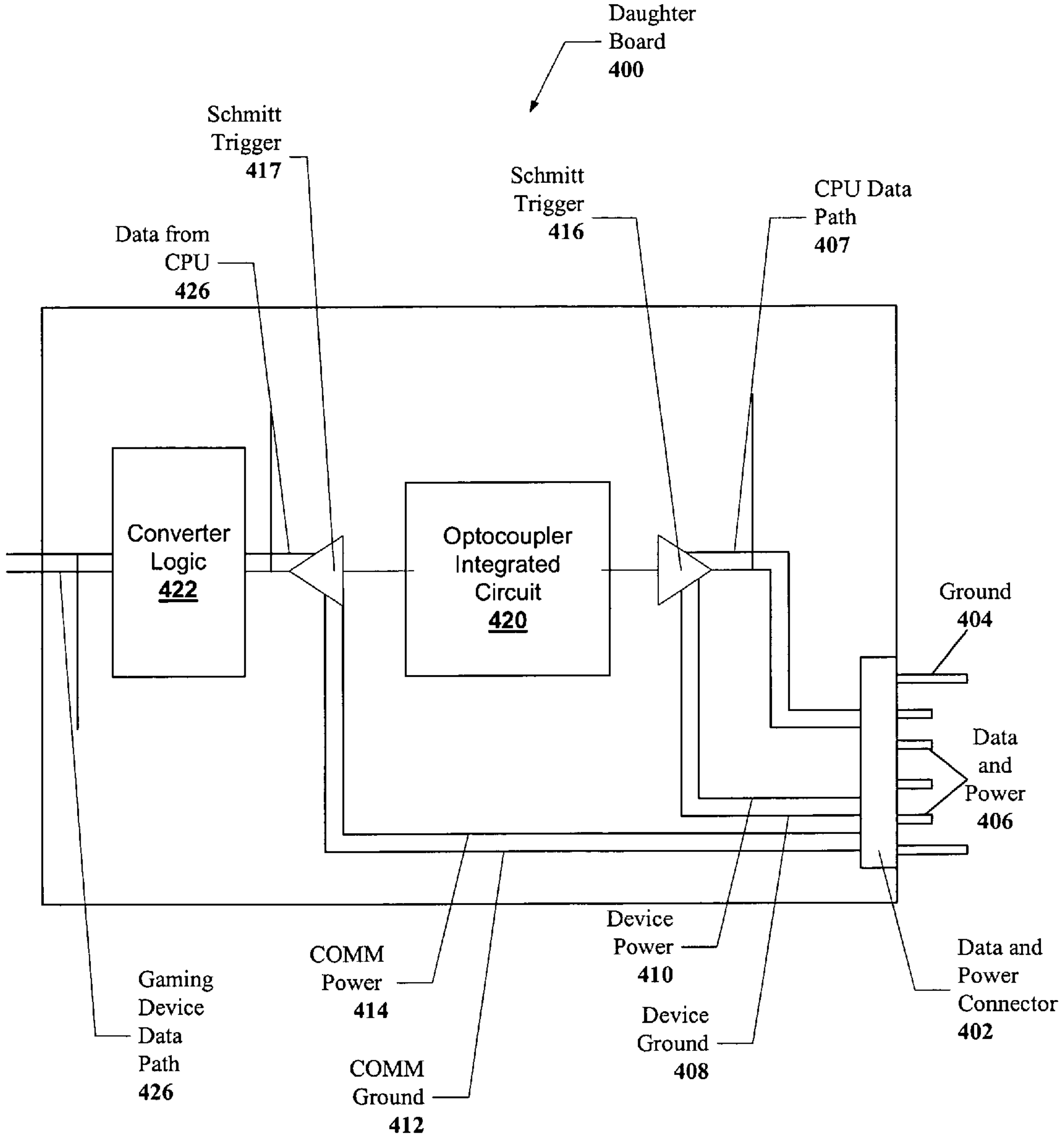
FIG. 4 is a block diagram depicting a more detailed example of a daughter board for a gaming device communication interface.

FIG. 4 is a block diagram depicting a more detailed example of a daughter board for a gaming device communication interface. To enable communication between the motherboard and gaming device, the daughter board 400 is one embodiment of hardware which might be used to convert between RS-232 signals from a motherboard on a gaming machine and RS-232 or RS-422/485 signals from a gaming device. The daughter board 400 in FIG. 4 may be plugged into a daughter board receptor slot 302 on a main communication board 300 as shown in FIG. 3 using the Data and Power Connector 402 attached to the daughter board 400. Typically, the connector may be a 15 pin connector (all of the pins are not shown in the figure) or some other type of standard connector which may be designed to be inserted into a standard receptor slot on the main communication board. The Data and Power Connectors 402 may contain two ground pins 404 which may be longer than the Data and Power pins 406. The ground pins 404 may be longer than the Data and Power pins 406 so that the ground pins 404 enter before the Data and Power pins 404 when the daughter board 400 is inserted into a daughter board receptor. The daughter board receptor may have an active power source. Thus, the longer ground pins 404 may help to ground the daughter board 400 before it receives power from the main communication board. When the daughter board 400 is grounded, the likelihood of damage to the daughter board is lessened during installation of the daughter board 400 into the main communication board and may enable the daughter board 400 to be replaced while the main communication board is receiving power.

The data and power pins 406 may provide signals to the CPU data path 407 and two sources of power as well as grounds for the power sources. The power sources are COMM Power 414 and Device Power 410. The ground sources are COMM ground 412 and Device ground 408. The functions of the COMM and device power sources are described with reference to FIGS. 2 and 3. The CPU data path 407 may carry signals needed to operate the gaming device or signals from the gaming device to the CPU. The signals on the CPU data path 407 may be passed through a Schmitt trigger 416. The Schmitt trigger may modify the waveform of the CPU data signals in a manner that provides a cleaner signal. For example, when the waveform of the CPU data signal input into the Schmitt trigger is a sinusoidal waveform, the Schmitt trigger may modify the signal such that a more square waveform is output from the Schmitt trigger. The Schmitt trigger 416 may require power from the device power source 410 and the device ground 408 to operate. When the device power source 410 is not available, the Schmitt trigger may not operate and the daughter board 400 may not perform as a communication interface. For example, the device power source might be switched off when a maintenance procedure is being performed on the gaming machine. With the device power 410 off for maintenance, the daughter board 400 might not operate.

The signals output from the Schmitt trigger 416 may be input into an "optocoupler" integrated circuit 420. The optocoupler integrated circuit 420 may convert the electrical signal input from the Schmitt trigger 416 to an optical signal and then back to an electrical signal. The conversion of the electrical signal to an optical signal and then back to an electrical signal provides electrical isolation which may prevent electrostatic discharge or some other potentially destructive signal arriving from the gaming device data path 426 from damaging the main communication board when the daughter board 400 is connected to the main communication board. Also, the optical isolation on the daughter board 400 may prevent damage to the motherboard via the CPU data path 407 when it is connected to the main communication board. As an example, when a game player uses a magnetic card reader for player tracking that is connected via a daughter board 400 to the gaming machine, the player may induce an electrostatic discharge in the magnetic card reader when a card is entered into the card reader. The electrostatic discharge may enter the daughter board 400 via the gaming device data path 426 but the optical isolation provided by the optocoupler integrated circuit 420 might prevent the electrostatic discharge from passing through the daughter board 400. Thus, the daughter board 400 may prevent damage to the main communication board and other components which may be connected to the main communication board. As another example, when the daughter board 400 is connected to a gaming machine network, the electrical isolation may prevent electrostatic discharge from a connection to the gaming machine network from passing through the daughter board.

The output from the optocoupler integrated circuit 42, which is an electrical signal, may be input to another Schmitt trigger 417. Again, the Schmitt trigger may modify the waveform of the CPU data signals in a manner that provides a cleaner signal. The Schmitt trigger 417 may receive power from the COMM power source 414 and device ground 412 to operate. When the COMM power source 414 is not available, the Schmitt trigger 417 may not operate and the daughter board 400 may not perform communication conversion. The signal output from the Schmitt trigger 417 may be input into circuitry 422 that contains logic for converting between different communication standards. The output of the converter logic 422 may be a signal of some type to the gaming device data path 426 which may be received and interpreted by the gaming device. The output mechanism from the gaming device data path 426 may be a ribbon-line cable, a twisted pair cable or some other wire medium.

The communication conversion process on the daughter board 400 may work in the opposite direction. Thus, the converter logic may receive an input signal of some type from the gaming device data path 426. Then, the converter logic 422 may output a modified signal which may be passed through the Schmitt trigger 417, optocoupler integrated circuit 420, the Schmitt trigger 416 and out the data power connector 402 to the CPU on the motherboard. The Schmitt triggers, 416 and 417, may modify the signal and the optocoupler integrated circuit 420 may provide electrical isolation in the same manner as when the signal is from the motherboard to the gaming device.

As examples, the converter logic 422 may convert between two implementations of the RS-232 standard. As another example, the converter logic may convert between the RS-232 standard and the RS-422/485 standard. In this example, for communication between a motherboard using the RS-232 standard and a gaming device using the RS-232 standard, an RS-232 signal from the motherboard may be converted by a daughter board 400 with the RS-232 converter logic 422 to an RS-232 signal which may be interpreted by the gaming device. Further, for communication between a motherboard using the RS-232 standard and a gaming device using the RS-422/485 standard, a RS-232 signal from the motherboard may be converted by a daughter board 400 with the RS-422/485 converter logic 422 to an RS-422/485 signal which may be interpreted by the gaming device. Conversely, for communication between a gaming device using the RS-232 standard and a motherboard using the RS-232 standard, an RS-232 signal from the gaming device may be converted by a daughter board 400 with the RS-232 converter logic 422 to an RS-232 signal which may be interpreted by the motherboard. Also, for communication between a gaming device using the RS-422/485 standard and a motherboard using the RS-232 standard, an RS-422/485 signal from the gaming device may be converted by a daughter board 400 with the RS-232 converter logic 422 to an RS-232 signal which may be interpreted by the motherboard. The present invention is not limited to the types of data conversions listed above. Daughter boards may be developed which may convert between any two communication standards including RS-422/485, Fiber Optic, RS-232, DCS Current Loop and Link Progressive Current Loop. Further, daughter boards may be developed which may convert between two or more communication standards.

Figure 5:
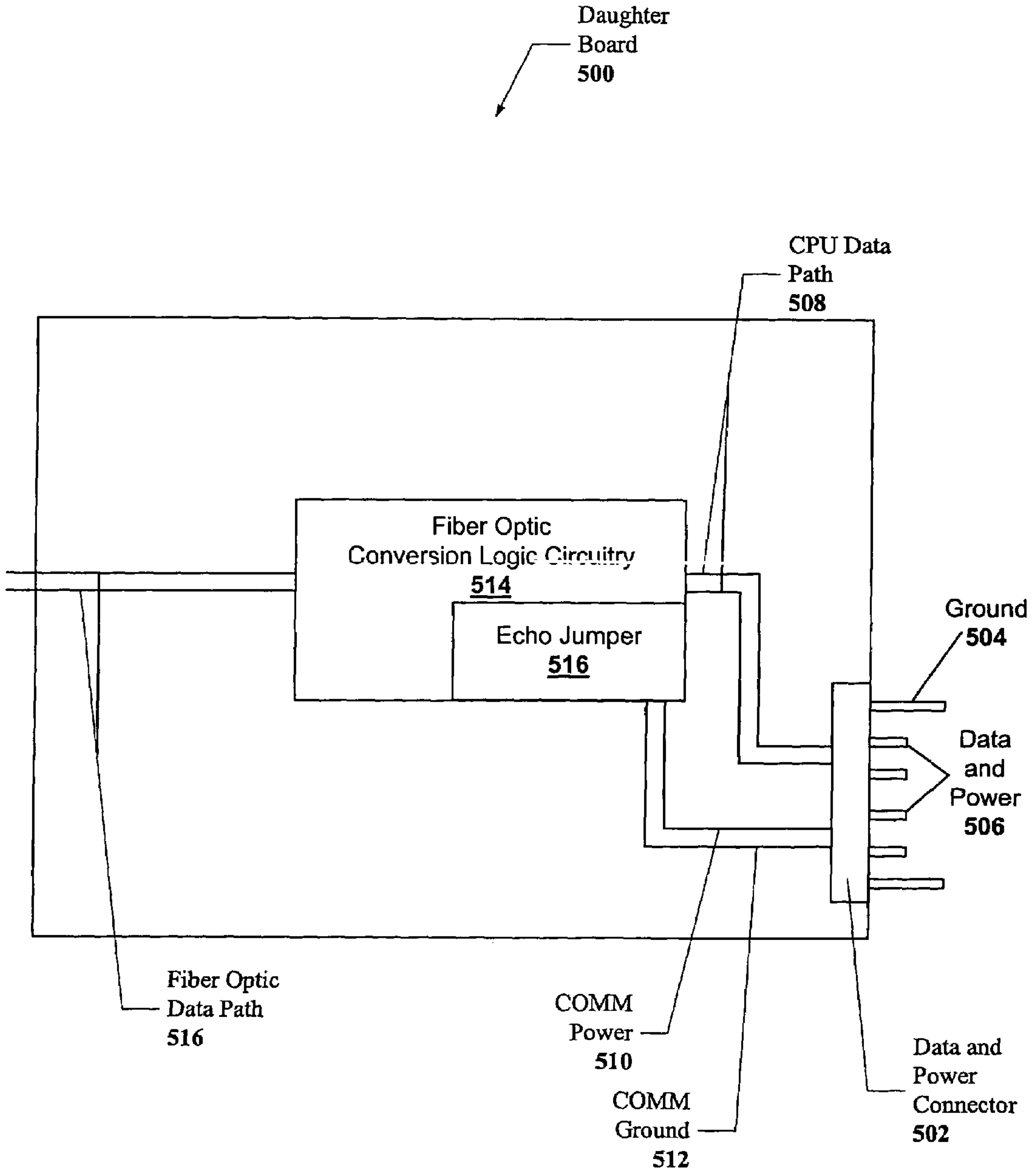
FIG. 5 is a block diagram depicting a more detailed example of a daughter board for a fiber optic communication interface.

FIG. 5 is a block diagram depicting a detailed example of a daughter board for a fiber optic communication interface. To enable communication between the motherboard and the fiber optic network, the daughter board 500 is one embodiment of hardware which might be used to convert between RS-232 signals from a motherboard on a gaming machine and fiber optic signals from a fiber optic network. The conversion process is not limited to between RS-232 and fiber optic. Daughter boards may be developed which convert between fiber optic and any communication standard employed by the motherboard. The daughter board 500 in FIG. 5 may be plugged into a daughter board receptor slot 302 on a main communication board 300 as shown in FIG. 3 using the Data and Power Connector 502 attached to the daughter board 500. Typically, the connector may be a 15 pin connector (all of the pins are not shown in the figure) or some other type of standard connector which may be designed to be inserted into a standard receptor slot on the main communication board. The Data and Power Connectors 502 may contain two ground pins 504 which may be longer than the Data and Power pins 506. The ground pins 504 may be longer than the Data and Power pins 506 so that the ground pins 504 enter before the Data and Power pins 504 when the daughter board 500 is inserted into a daughter board receptor. The daughter board receptor may have an active power source. As explained above in the context of FIG. 4, the longer ground pins 504 may help to ground the daughter board 500 before it receives power from the main communication board. When the daughter board 500 is grounded, the likelihood of damage to the daughter board is lessened during installation of the daughter board 500 into the main communication board and may enable the daughter board 500 to be replaced while the main communication board is receiving power.

The data and power pins 506 may provide signals to the CPU data path 508 and a source of power as well as a ground for the power source. The power source may be COMM Power 410 and the ground source may be COMM ground. One function of the COMM power source, which described with reference to FIGS. 2 and 3, is to provide constant power. The constant power source may be needed to maintain the integrity of a gaming machine network. For example, a number of gaming machines may be linked by fiber optic cable in a daisy chain to form a network. When a link in the chain is broken from loss of power to one of the gaming machines, some machines on the network may lose communication capability with the rest of the network. The CPU data path 508 may carry signals needed to operate a gaming device using a fiber optic communication standard or to communicate with a fiber optic network. The CPU data path 508 may receive signals to the CPU from a gaming device using a fiber optic standard or may receive signals to the CPU from a fiber optic network. The signals on the CPU data path 508 may be passed to circuitry 514 which performs conversion between a fiber optic communication standard and the communication standard of the motherboard. The fiber optic conversion logic circuitry 514 may require power from the COMM power source 510 and the COMM ground 512 to operate. When the COMM power source 510 is not available, the fiber optic conversion logic circuitry 514 may not operate and the daughter board 500 may not perform as a communication interface. For example, the COMM power source might be switched as a result of a power failure. With the COMM power 510 off, the daughter board 500 might not operate.

The output of the fiber optic conversion logic may be a fiber optic signal to the fiber optic data path 516. The fiber converter logic 522 may convert between the RS-232 standard and the fiber optic standard. For communication between a motherboard using the RS-232 standard and a gaming device or gaming network using the fiber optic standard, an RS-232 signal from the motherboard may be converted by a daughter board 500 with the fiber optic converter logic 514 to a fiber optic signal which may be interpreted by the gaming device or gaming network using fiber optic communication. The fiber optic signal, sent out via the output mechanism provided by the fiber optic data path 516, might carry information needed to operate a gaming device or provide information about the status of the gaming machine. For example, when money is accepted by the gaming machine incorporated into a wide area progressive network, a fiber optic signal might be sent out via the fiber optic data path 516 to a remote location where the amount of money accepted by all the gaming machines in the wide area progressive network is tallied. The fiber optic conversion logic 514 is not limited to conversion between the fiber optic standard and the RS-232 standard. Daughter boards 500 may be designed which convert between different fiber optic standards and any communication standard employed by the motherboard.

When connected in a daisy chain, the fiber optic daughter board 500 may be configured to receive a disable communication signal using an echo jumper 516. The echo jumper 516 may be part of the fiber optic conversion logic circuitry 514. The echo jumper 516 may receive a software driven control line which commands the fiber optic daughter board not to echo communication signals from other fiber optic daughter boards 500. For example, when a number of gaming machines are connected in a daisy chain using fiber optic daughter boards 500, the receiving connection of the fiber optic daughter board of the first gaming machine may be connected to the transmission connection of some master communication device. The master communication device may be a gaming machine or some other hardware with communication capabilities. Then, the receiving connection of the fiber optic daughter board of the second gaming machine in the chain may be connected to the transmission connection of the fiber optic daughter board of the next gaming machine. This connection pattern of connecting the transmission connection to the receiving connection on the fiber optic daughter boards of adjacent gaming machines may be repeated for each gaming machine in the chain until reaching the last gaming machine. The transmission connection on the fiber optic daughter board of the last gaming machine in the chain may be connected to the receiving connection on the fiber optic daughter board in the master communication device. In this daisy chain configuration, each machine echoes upstream communication to the rest of the loop whether or not the power is on to a particular gaming machine. The master communication device receives everything sent on the loop including its own communication requests. The default configuration of the chain might be for each gaming machine to echo communication. With the echo jumper 516, a command using the control line is sent to a particular gaming machine in the chain to stop echoing communication signals received by a gaming machine upstream of it in the loop. This command to stop echoing communication is used for testing and troubleshooting of the daisy chain.

The communication conversion process on the daughter board 500 may work in the opposite direction. Thus, the fiber optic converter logic may receive an input signal of some type from the fiber optic data path 516. Then, the fiber optic converter logic 514 may output a modified signal which may be passed through CPU data path 508 and out the data power connector 502 to the CPU on the motherboard. As an example, a signal might be receive from the fiber optic data path 516 from a fiber optic wide progressive network on the amount of a jackpot. This information might be converted to a signal by the fiber optic converter logic 514 which could be interpreted by the CPU on the motherboard. This signal might be passed along the CPU data path 508 and out the data and power connector 502 to a main communication board and then to a motherboard with a CPU connected to the main communication board. The CPU on the motherboard might receive the signal indicating the amount of the jackpot and send instructions to a display sign connected to the motherboard through the main communication board to display the amount of the jackpot. This jackpot amount might be viewed by a player playing a game on the gaming machine.

Although the foregoing invention has been described in some detail for purposes of clarity of understanding, it will be apparent that certain changes and modifications may be practiced within the scope of the appended claims. For instance, while the gaming machines of this invention have been depicted as having accessible gaming devices physically attached to a main gaming machine cabinet, the use of gaming devices in accordance with this invention is not so limited. For example, the devices commonly provided in a display sign may be included in a standalone cabinet proximate to, but unconnected to, the main gaming machine chassis.

What is claimed is:

1. In a gaming machine having a master gaming controller and at least one other gaming device, a method of operating said gaming machine comprising:

providing a main communication board adapted to facilitate communication via various communications formats, said main communication board having a plurality of standard receptor slots;

providing power to said main communication board via a first power connection;

providing a first daughter board in a first standard receptor slot of said main communication board, said first daughter board adapted to convert signals sent from the master gaming controller in a first communications format to signals in a second communications format for transmission to said other gaming device or along a gaming machine network;

providing power to said first daughter board via a second power connection;

switching off power through said first power connection to said main communication board;

maintaining power to said first daughter board via said second power connection during said step of switching off power through said first power connection to said main communication board;

providing a second daughter board in a second standard receptor slot of the main communication board, said second daughter board adapted to convert signals sent from the master gaming controller to signals in a third communications format for transmission to said other gaming device, another gaming device, or along a gaming machine network;

providing power to said second daughter board via a third power connection;

switching off power through said second power connection to said first daughter board;

maintaining power to said second daughter board via said third power connection during said step of switching off power through said second power connection to said first daughter board; and replacing said first daughter board with a third daughter board in said first standard receptor slot of the main communication board.

2. The method of claim 1, wherein said third power connection is provided from said main communication board through said second standard receptor slot.

3. The method of claim 2, wherein said third power connection provided through said second standard receptor slot is necessarily switched off when power is switched off through said first power connection.

4. The method of claim 1, wherein said third daughter board is adapted to convert signals sent from the master gaming controller to signals in a fourth communications format for transmission to said other gaming device, yet another gaming device, or along a gaming machine network.

5. The method of claim 1, further including the step of:

switching power through said second power connection back on to said third daughter board after said third daughter board is placed in said first standard receptor slot.

6. The method of claim 1, further including the step of:

providing a fourth daughter board in a third standard receptor slot of the main communication board, said fourth daughter board adapted to convert signals sent from the master gaming controller to signals in a fourth communications format for transmission to said other gaming device, another gaming device, or along a gaming machine network.

7. The method of claim 6, wherein each of said first, second, third and fourth communications formats is selected from the group consisting of RS-422/485, Fiber Optic, RS-232, DCS Current Loop, Link Progressive Current Loop and USB.

8. The method of claim 1, wherein each of said first, second and third communications formats is selected from the group consisting of RS-422/485, Fiber Optic, RS-232, DCS Current Loop, Link Progressive Current Loop and USB.

9. The method of claim 1, wherein said main communication board is adapted to facilitate communications via a different communications format at each of said plurality of standard receptor slots.

10. The method of claim 1, wherein said main communication board contains at least four standard receptor slots.

* * * * *